UNITED STATES PATENT OFFICE.

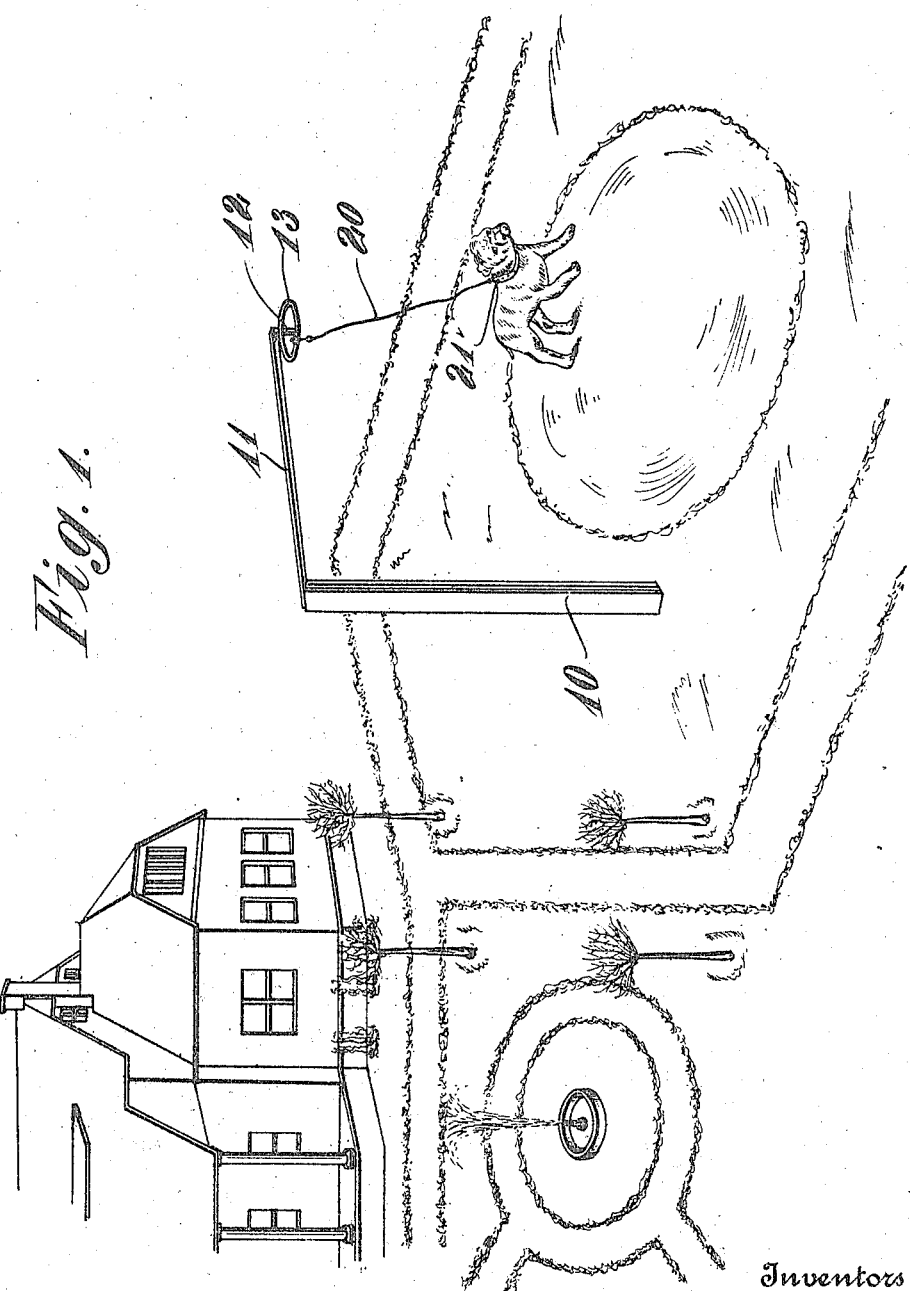

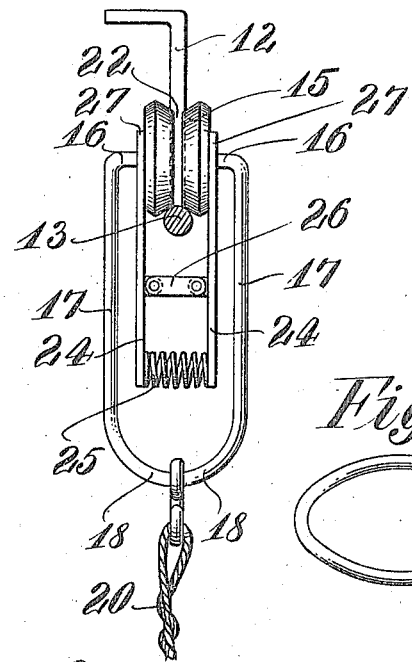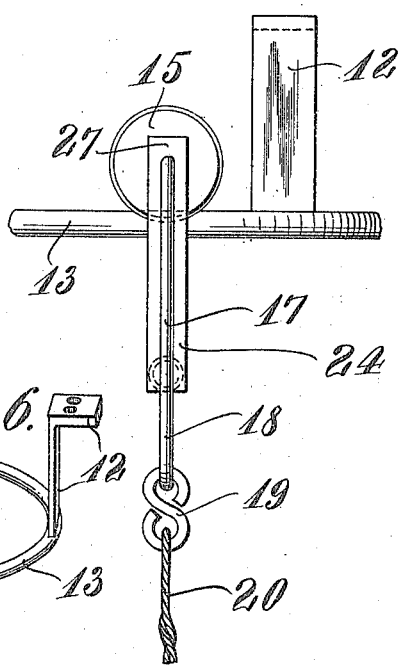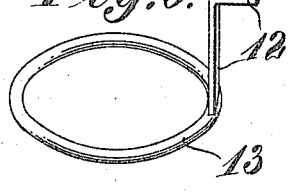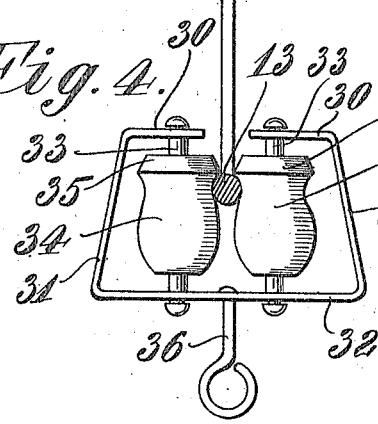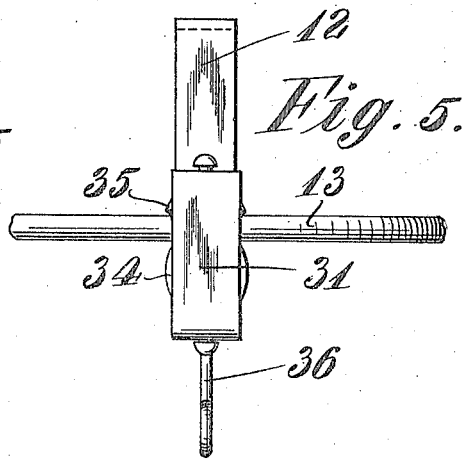

ANTONI CZAJA AND JOHN HAREZA, OF GARY, WEST VIRGINIA.

ANIMAL-TETHER.

1,233,649.

Specification of Letters Patent.

Patented July 17, 1917.

Application filed November 29, 1916. Serial No. 134,018.

*To all whom it may concern:*

Be it known that we, ANTONI CZAJA, a subject of the Emperor of Austria, resident of Gary, county of McDowell, and State of West Virginia, and JOHN HAREZA, a subject of the Emperor of Austria, resident of Gary, county of McDowell, and State of West Virginia, have invented certain new and useful Improvements in Animal-Tethers, of which the following is a specification.

This invention relates to improvements in animal tethering devices, and has as its principal object the provision of means whereby small animals of a domestic nature may be permitted a certain range of freedom, and yet be securely held within limits.

Another object is to provide such means in forms which may be instantly removed or engaged with fixed parts thereof, the operation of engaging or disengaging being accomplished without any keys, tools, or implements whatever. These and other like objects are attained by the novel arrangement of parts hereafter described and shown in the annexed drawings, forming a component part of this specification, and in which:—

Figure 1 is a perspective view indicating the application of the invention.

Fig. 2 is a fragmental front view illustrating the preferred embodiment of the device.

Fig. 3 is a side view of the same.

Fig. 4 is a view similar to Fig. 2 but showing a modified form of construction.

Fig. 5 is a side view of the same, and

Fig. 6 is a plan view of the fixed ring.

The desirability of securing small animals within a restricted range is of so frequent an occasion, that many arrangements have been tried for the purpose, most of which fail in the fact that the animal is likely to become entangled in the cord by which it is fastened, entailing injuries and damages to the animal.

It is, therefore, the principal object of this invention to prevent the entanglement or engagement of the animal with the cord or chain, the arrangement of which will be clearly understood from the following description.

In Fig. 1, the post 10 is inserted in the ground at any desired point, the post having firmly fastened to its upper end an arm 11, which should be of sufficient length to extend outward to the center of the circle which constitutes the area of the runway in which the animal is to be secured.

Attached to the arm 11, by the bracket 12, is an annular ring 13, the same being disposed in a horizontal plane, these three elements constituting the fixed elements of the upper part of the apparatus.

Engageable with the ring, which is preferably of circular cross section, are two oppositely disposed, symmetrical rollers 15, slidably mounted upon the alined ends 16, of a wire bracket 17, looped at its extreme lower end 18 and having connected therewith an S shaped link 19, in the lower eye of which is attached a cord or chain 20, having its lower end attached to the collar 21 by which the animal is secured.

The inner sides of the rollers 15 are arranged closely adjacent and with the bracket, constitute a form of trolley which may readily traverse over the entire surface of the fixed ring 13, the opening 22 between the rollers being sufficient to permit the vertical member of the bracket 12 to pass between, thus allowing a complete circuit to be made of the ring by the trolley.

When it is desired to separate the trolley from the fixed ring, pressure is applied at the lower end of the levers 24, tending to close them together, opposing the spring 25, the levers being pivoted upon a link 26 causing the outer ends 27 to separate and carry with them the rollers 15, increasing the space 22 to such distance as to allow the ring 48 to pass between their adjacent sides.

In the adaptation shown in Figs. 4 and 5, the same form of bracket hanger 12 is employed, and also the same ring element 13; the trolley in this case is comprised of a frame having upper arms 30 formed in alinement, the same being connected by angularly disposed members 31 with the base 32, between which and the arm elements 30, extend vertical rods 33 upon which are rotatably mounted rollers 34 having beveled upper ends 35 adapted to be sprung into engagement over the upper surface of the ring 13 or withdrawn therefrom by springing the base element 32 sufficiently to spread the rollers in dismounting the same.

A hook element 36 is provided at the bottom of the base for attaching the cord 20 in the manner before described.

In operation, the fixed ring 13 having been secured at the point where the animal is to be permitted to travel, and the cord 20 having been engaged with the eye 19, the device is raised into position and engaged with the fixed ring 13, the spring elements 25 or 32 holding the pulleys or spools with sufficient tension to prevent their being inadvertently pulled away from the ring but allowing the trolley sufficient freedom to permit travel therearound.

From the inspection of the drawing, it will be evident that it will be difficult for the animal to become entangled with the cord by which it is controlled, and that the animal has entire freedom of its limbs to exercise as may be desired.

Having thus described my invention, what I claim as new, and desire to secure by Letters Patent, is:—

1. In a device of the class described, the combination with a vertical post, an arm extending horizontally therefrom, of a fixed ring engaged at the extremity of said arm, a trolley detachably engaged with said ring, said trolley being capable of traversing said ring, and means permitting disassociation of said trolley from said ring.

2. In a device of the class described, the combination with a fixed upright, a horizontal arm engaged therewith, of a ring secured to the extremity of said arm, a trolley removably mounted on said fixed ring, connections between said trolley and the animal to be secured, rotatable elements combined with said trolley, said elements being arranged in pairs and having a space between adapted to pass over the support of said ring, and means for increasing the space between said rollers, whereby the trolley may be removed from said ring.

In testimony whereof we have affixed our signatures this 20th day of November, 1916.

ANTONI CZAJA.
JOHN HAREZA.